(No Model.)
W. C. NELSON.
PAN LIFTER.
No. 584,081. Patented June 8, 1897.
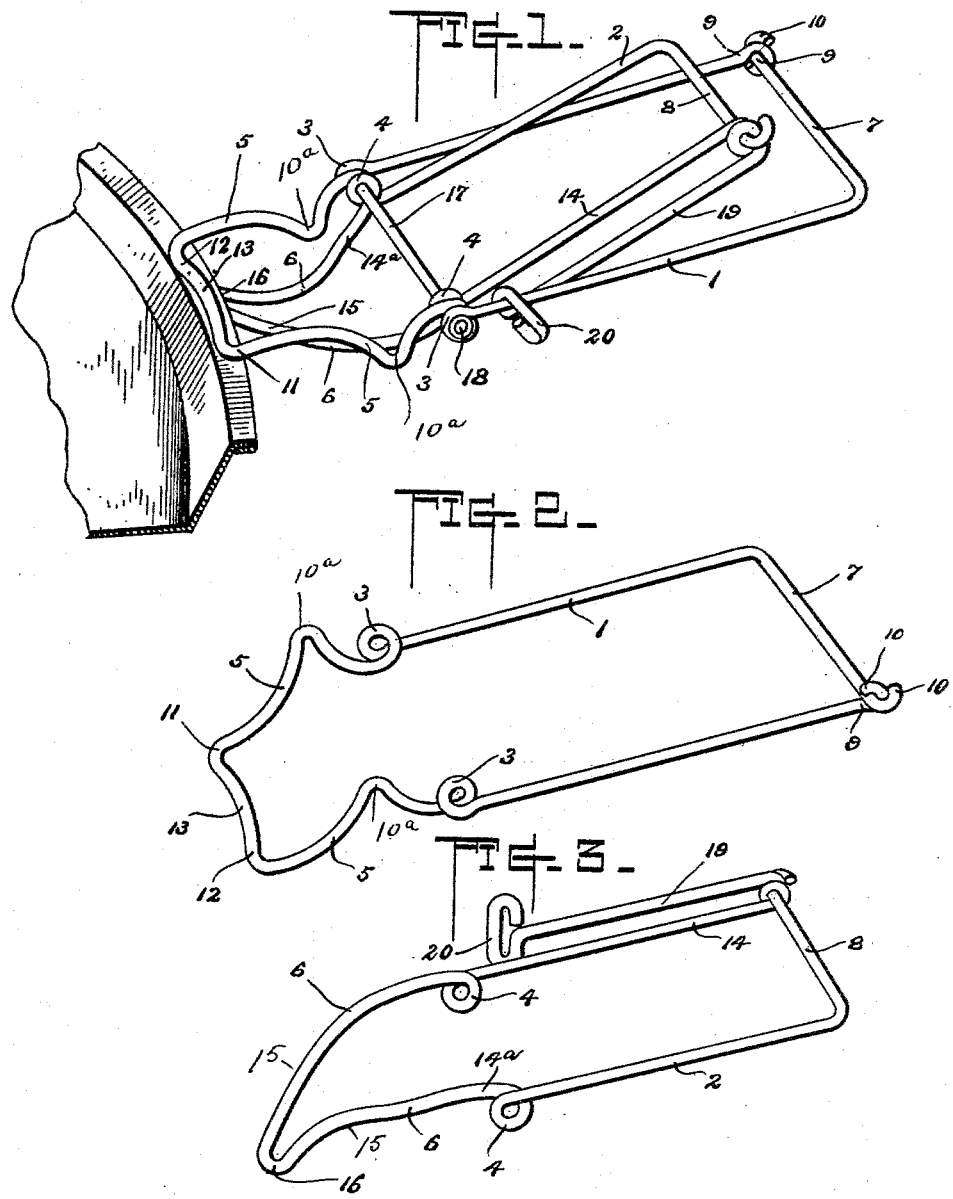
WITNESSES
INVENTOR,
William C. Nelson,
by John Wedderburn
Attorney

UNITED STATES PATENT OFFICE.

WILLIAM CLARK NELSON, OF SANTA ROSA, CALIFORNIA.

PAN-LIFTER.

SPECIFICATION forming part of Letters Patent No. 584,081, dated June 8, 1897.

Application filed December 28, 1896. Serial No. 617,186. (No model.)

*To all whom it may concern:*

Be it known that I, WILLIAM CLARK NELSON, a citizen of the United States, residing at Santa Rosa, in the county of Sonoma and State of California, have invented certain new and useful Improvements in Pan-Lifters; and I do hereby declare the following to be a full, clear, and exact description of the invention, such as will enable others skilled in the art to which it appertains to make and use the same.

My invention relates to improvements in detachable handles of the general class known as "pan-handles," and has for its object the production of a simple and efficient device designed to facilitate the moving of cooking utensils.

To the accomplishment of this object my invention consists in providing a pair of pivoted members constructed of heavy wire bent in a peculiar manner and of such configuration as to facilitate the secure gripping of a pan, stove-lid, or other object likely to require to be moved while heated.

In the accompanying drawings, forming a part of this specification, Figure 1 is a perspective view of my device as applied to a pan, and Figs. 2 and 3 are detail perspective views of the pivoted members detached.

Referring to the numerals on the drawings, 1 and 2 indicate a pair of pivoted members provided, respectively, with correlative bearing-loops 3 and 4, located intermediate of the clamp ends 5 and 6 and the handles 7 and 8 of the members. The member 1 is preferably composed, as illustrated, of a single strand of heavy wire bent into substantially rectangular form, the ends 9 of the strand being bent upon each other, as indicated at 10. The clamp end of this member is bent downwardly to form a beak 10ª immediately in front of the bearing-loops 3 and is bent upwardly in a gradual curve to form a grip 11, the transverse bar 12 of which is curved, as illustrated at 13, to facilitate its bite upon the object to be lifted. The member 2 is composed, like the member 1, of a single strand of wire bent to form a rectangular handle 14 upon one side of the bearing-loops 4 and what I will term the "lower grip" or "lifter" 14ª of my device extending upon the side of the loops 4 opposite the handle 14. The side strands 15 of the lower grip extend downwardly in a comparatively sweeping curve from the loops 4 and converge to a sharp bend 16, which constitutes the extremity of the grip.

17 indicates a pivot-bolt extending transversely through the bearing-loops of the pivoted members, constituting a pivot therefor and preferably provided upon its opposite extremities with heads and washers 18, as illustrated.

Any suitable means for limiting the pivotal movement of the members and for yieldingly retaining them in the open position may be provided. I prefer, however, to elongate one end 19 of the strand composing the member 2 and to yieldingly secure it to one of the side bars of the handle 14, as by a loop 20, encircling it. It will thus be seen that the end 19, extending from the loop 20 to the end of the handle, constitutes a powerful spring designed to retain the grips in their open positions.

By the peculiar form of grips illustrated the gripping of a pan or similarly-shaped vessel is facilitated, inasmuch as a bite is obtained upon the rim of said vessel at two separate points.

In operation the device is clamped upon the pan, the bead of which is located just behind the beak 16, the extremities of the grips gripping the rim of the pan at a point above the bead, as illustrated in Fig. 1. The curvature of the transverse bar 12 facilitates the holding of such objects as a stick of kindling-wood, a lid-lifter, or the like, and the comparatively narrow beak may be employed in place of a lid-lifter by introducing its extremity in the lid-socket in the manner well known.

It will be observed from the foregoing that I have produced a simple, durable, and efficient lifter which by its peculiar design is calculated to lift with security a large number of articles greatly varying in shape and size.

I do not desire to limit myself to the details of construction herein shown and described, but reserve to myself the right to change, modify, or vary such details within the scope of my invention.

Having thus described my invention, what I claim as new, and desire to secure by Letters Patent, is—

1. In a device of the character described, the combination with a pivoted member composed of a single strand of wire bent to form bearing-loops intermediate of its ends, of a second pivoted member likewise formed of a single strand of wire, and bent to form bearing-loops correlative with the bearing-loops of the first-named member, and having its extremity bent upon itself and limited in its movement by the first-named pivoted member, whereby the spring action between the spring members is secured, substantially as described.

2. In a device of the character described, the combination with a pivoted member 1, bent to form a rectangular handle 7, bearing-loops 3, a beak $10^a$ and a grip 11, of a second pivoted member bent to form a substantially rectangular handle 8, bearing-loops 4, a lower grip $14^a$ and a spring end 19 operatively connected with a handle 7, substantially as described.

In testimony whereof I have signed this specification in the presence of two subscribing witnesses.

WILLIAM CLARK NELSON.

Witnesses:
W. B. FOWLER,
ROSS CAMPBELL.